(12) United States Patent
Ramachandran et al.

(10) Patent No.: US 7,916,704 B2
(45) Date of Patent: Mar. 29, 2011

(54) METHOD OF COMMUNICATION SCHEDULING IN A MULTIHOP NETWORK

(75) Inventors: Shyamal Ramachandran, Heathrow, FL (US); Eugene Visotsky, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 906 days.

(21) Appl. No.: 11/770,976

(22) Filed: Jun. 29, 2007

(65) Prior Publication Data

US 2009/0003267 A1 Jan. 1, 2009

(51) Int. Cl.
*H04W 4/00* (2009.01)

(52) U.S. Cl. ............... 370/338; 370/310.2; 370/328; 370/315; 370/395.3; 370/395.4; 455/450; 455/451; 455/452.1; 455/11.1; 455/13.1

(58) Field of Classification Search ............ 370/338, 370/329, 315, 322, 310.2, 328, 341, 274, 370/395.21, 395.4, 395.41, 492, 501, 316, 370/395.3, 395.2; 455/450, 451, 452.1, 452.2, 455/453, 455, 464, 509, 516, 11.1, 13.1, 455/446–449, 421
See application file for complete search history.

(56) References Cited

U.S. PATENT DOCUMENTS

| | | | |
|---|---|---|---|
| 6,747,976 B1 | 6/2004 | Bensaou et al. | |
| 2004/0228349 A1 | 11/2004 | Vrzic et al. | |
| 2005/0232183 A1* | 10/2005 | Sartori et al. | 370/319 |
| 2006/0046643 A1* | 3/2006 | Izumikawa et al. | 455/7 |
| 2006/0046658 A1* | 3/2006 | Cruz et al. | 455/67.11 |
| 2007/0070929 A1* | 3/2007 | Kang et al. | 370/310 |
| 2007/0072604 A1* | 3/2007 | Wang | 455/428 |
| 2007/0097945 A1* | 5/2007 | Wang et al. | 370/349 |
| 2008/0068979 A1 | 3/2008 | Visotsky et al. | |
| 2010/0046413 A1* | 2/2010 | Jin et al. | 370/315 |

OTHER PUBLICATIONS

IEEE C802.16j-07/166—Dedicated Bandwidth Reservation for RS in MR Networks—Byung-Jae Kwak et al—Jan. 2007—12pp.
PCT International Search Report Application No. PCT/US2008/067961 Dated Nov. 11, 2008—14 Pages.
Hoymann C., Klagges K., Schinnenburg M.: Multihop Communication in Relay Enhanced IEEE 802.16 Networks—4 Pages, 2006.
PCT/US2008/067961, Preliminary Report on Patentability, mailed Jan. 14, 2010, 8 pages.

* cited by examiner

*Primary Examiner* — Kent Chang
*Assistant Examiner* — San Htun
(74) *Attorney, Agent, or Firm* — Randi L. Karpinia (57) ABSTRACT

A method of communication scheduling in a multihop network is provided. The multihop network comprises a base station and at least one relay station. The method includes allocating a downlink relay to a relay station; assigning a first one or more connection identifiers to be locally scheduled at the relay station for communication on a first portion of the downlink relay; and assigning a second one or more connection identifiers to be centrally scheduled by the base station for communication on a second portion of the downlink relay.

9 Claims, 8 Drawing Sheets

METHOD OF COMMUNICATION SCHEDULING IN A MULTIHOP NETWORK

FIELD OF THE INVENTION

The present invention relates generally to wireless communication networks and more particularly to the scheduling of data and control communications within a multihop communication network utilizing relay stations.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of adhoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination.

IEEE 802.16 is a point-to-multipoint (PMP) system with one hop links between a base station (BS) and a subscriber station (SS). Such network topologies severely stress link budgets at the cell boundaries and often render the subscribers at the cell boundaries incapable of communicating using the higher-order modulations that their radios can support. Pockets of poor-coverage areas are created where high data-rate communication is impossible. This in turn brings down the overall system capacity. While such coverage voids can be avoided by deploying BSs tightly, this drastically increases both the capital expenditure (CAPEX) and operational expenditure (OPEX) for the network deployment. A cheaper solution is to deploy relay stations (RSs) (also known as relays or repeaters) in the areas with poor coverage and repeat transmissions so that subscribers in the cell boundary can connect using high data rate links.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to using locally scheduled zones in a multihop network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of using locally scheduled zones in a multihop network described herein. The non-processor circuits may include, but are not limited to, a radio receiver, a radio transmitter, signal drivers, clock circuits, power source circuits, and user input devices. As such, these functions may be interpreted as steps of a method of using locally scheduled zones in a multihop network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
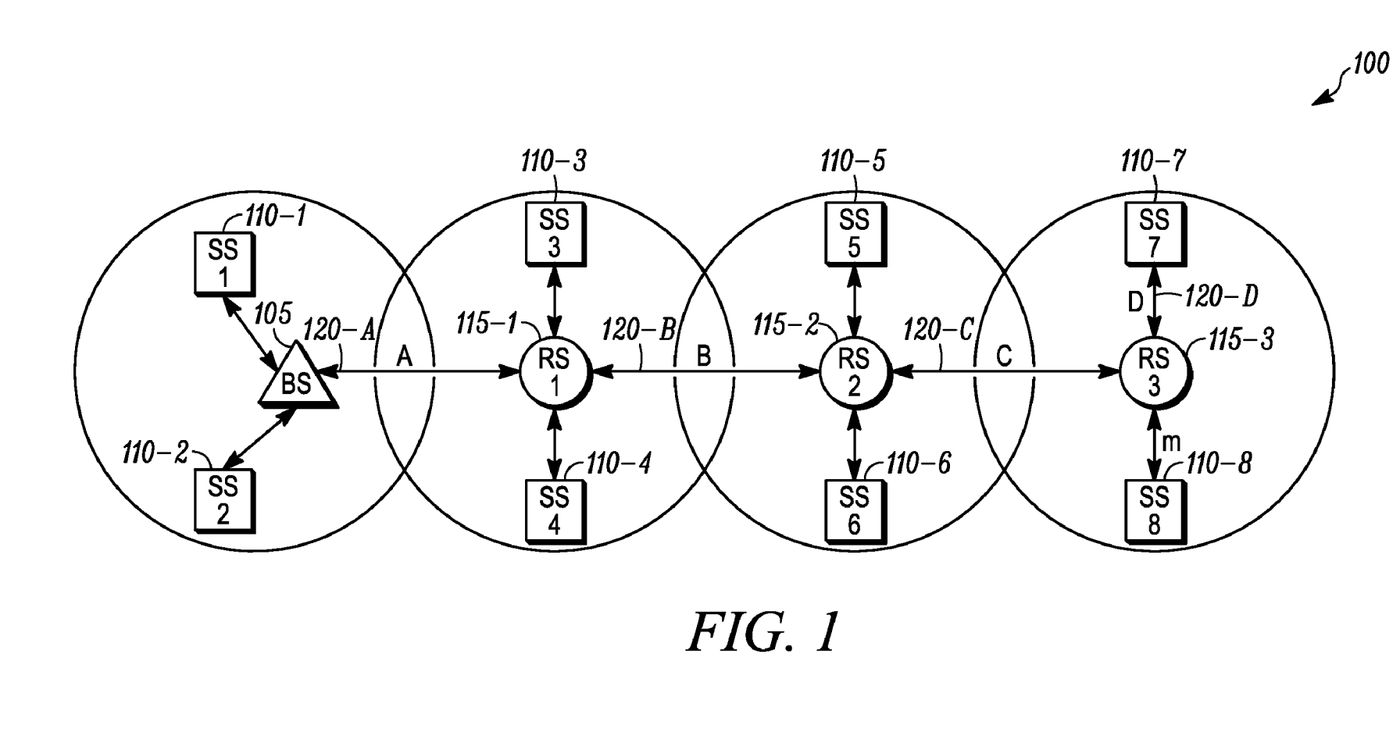
FIG. 1 illustrates an example wireless communication network.

FIG. 1 illustrates a wireless communication network for use in the implementation of at least some embodiments of the present invention. FIG. 1 specifically illustrates an IEEE 802.16 multihop network 100. As illustrated, the network 100 includes at least one base station 105 for communication with a plurality of subscriber stations 110-$n$ (also known as mobile stations). The multihop network 100 further includes a plurality of relays 115-$n$ (also known as relay stations or repeaters). In some networks, the relays 115-$n$ are simpler versions of the base station 105, in that they do not manage connections, but only assist in relaying data. Alternatively, the relays 115-$n$ can be at least as complex as the base station 105. Further, as illustrated in FIG. 1, the relay stations 115 can be deployed in a multi-hop pattern. In other words, the relay stations 115 communicate with the base station 105 via other relays 115-$n$. Further, these relays can be within each other's coverage. In the multihop network 100, RS1 115-1 is considered to be an ascendant station (i.e., a station through which, for example, RS2 115-2 communicates with the BS 105) for RS2 115-2 and RS3 115-3 is considered to be a descendant station for RS2 115-2. The relays 115-$n$ can be deployed in the areas with poor coverage and relay transmissions so that subscriber stations 110-$n$ in a cell boundary can connect using high data rate links. In some cases relays 115-$n$ may also serve subscriber stations 110-$n$ that are out of the coverage range of the base station 105. The relay stations (RS) introduced in an IEEE 802.16 system, therefore, can provide coverage and capacity gains by extending the base station's (BS) range and permitting subscriber stations (SS) to multihop to the BS.

Figure 2:
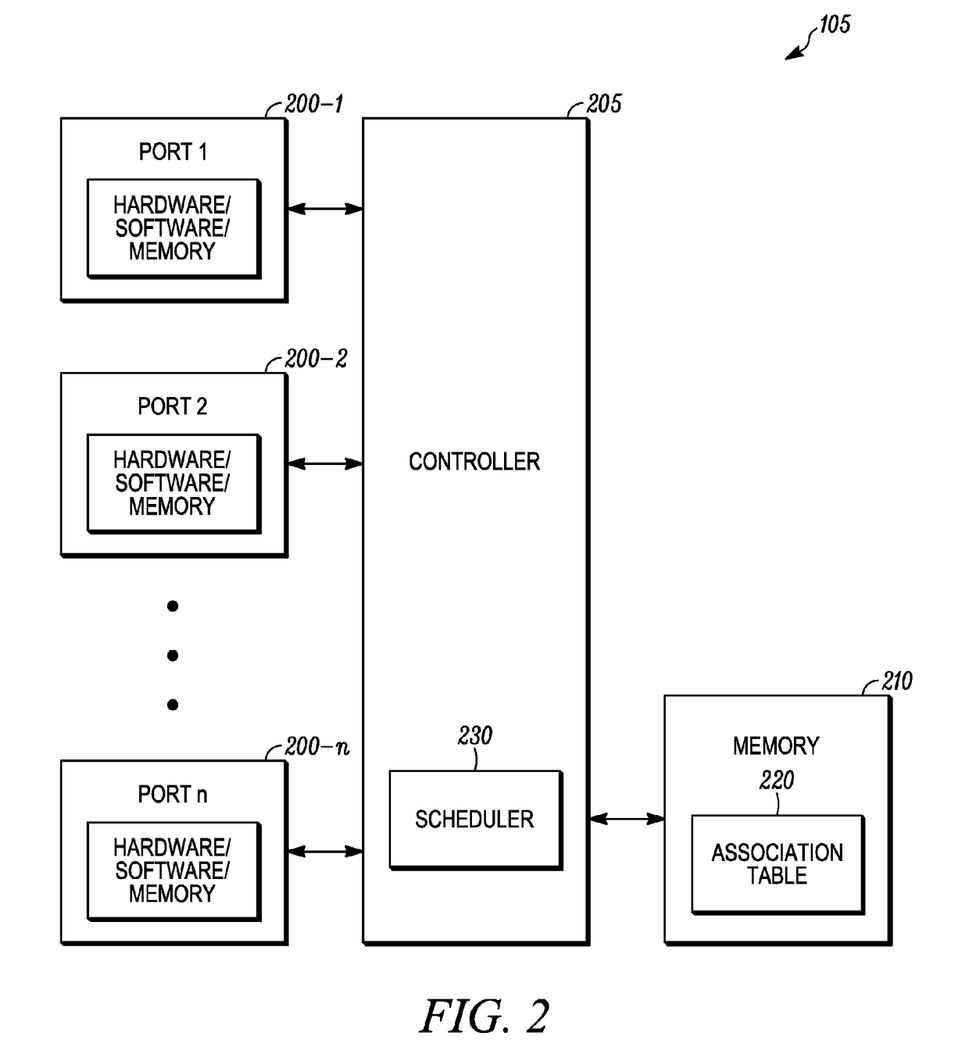
FIG. 2 illustrates an example base station for use in the wireless communication network of FIG. 1 in accordance with some embodiments of the present invention.

FIG. 2 illustrates a base station 105 in accordance with at least some embodiments of the present invention. As illustrated, the base station 105 comprises a plurality of ports 200-$n$, a controller 205, and a memory 210.

Each port 200-$n$ provides an endpoint or "channel" for network communications by the base station 105. Each port 200-$n$ may be designated for use as, for example, an IEEE 802.16 port or a backhaul port. For example, the base station 105 can communicate with one or more relay stations and/or one or more subscriber stations within an 802.16 network using an IEEE 802.16 port. An IEEE 802.16 port, for example, can be used to transmit and receive both data and management information.

A backhaul port similarly can provide an endpoint or channel for backhaul communications by the base station 105. For example, the base station 105 can communicate with one or more other base stations using the backhaul, which can be wired or wireless, via the backhaul port.

Each of the ports 200-$n$ are coupled to the controller 205 for operation of the base station 105. Each of the ports employs conventional demodulation and modulation techniques for receiving and transmitting communication signals respectively, such as packetized signals, to and from the base station 105 under the control of the controller 205. The packetized data signals can include, for example, voice, data or multimedia information, and packetized control signals, including node update information.

The controller 205 includes a scheduler 230 for the management of both uplink and downlink communication with the various subscriber stations (SS) 110-$n$ and relay stations (RS) 115-$n$ associated with the base station 105, which will be described in detail hereinafter. It will be appreciated by those of ordinary skill in the art that the scheduler 230 can be hard coded or programmed into the base station 105 during manufacturing, can be programmed over-the-air upon customer subscription, or can be a downloadable application. It will be appreciated that other programming methods can be utilized for programming the scheduler 230 into the base station 105. It will be further appreciated by one of ordinary skill in the art that the scheduler 230 can be hardware circuitry within the base station. In accordance with the present invention, the scheduler 230 can be contained within the controller 205 as illustrated, or alternatively can be an individual block operatively coupled to the controller 205 (not shown).

To perform the necessary functions of the base station 105, the controller 205 is coupled to the memory 210, which preferably includes a random access memory (RAM), a read-only memory (ROM), an electrically erasable programmable read-only memory (EEPROM), and flash memory.

The memory 210 includes storage locations for the storage of an association table 220. The association table 220, in accordance with the present invention, stores a listing of all subscriber stations 110-$n$ and relay stations 115-$n$ under the base station's domain along with other parameters such as the end-to-end path metrics to each of the subscriber stations 110-$n$ and relay stations 115-$n$ under its domain.

It will be appreciated by those of ordinary skill in the art that the memory 210 can be integrated within the base station 105, or alternatively, can be at least partially contained within an external memory such as a memory storage device. The memory storage device, for example, can be a subscriber identification module (SIM) card.

Figure 3:
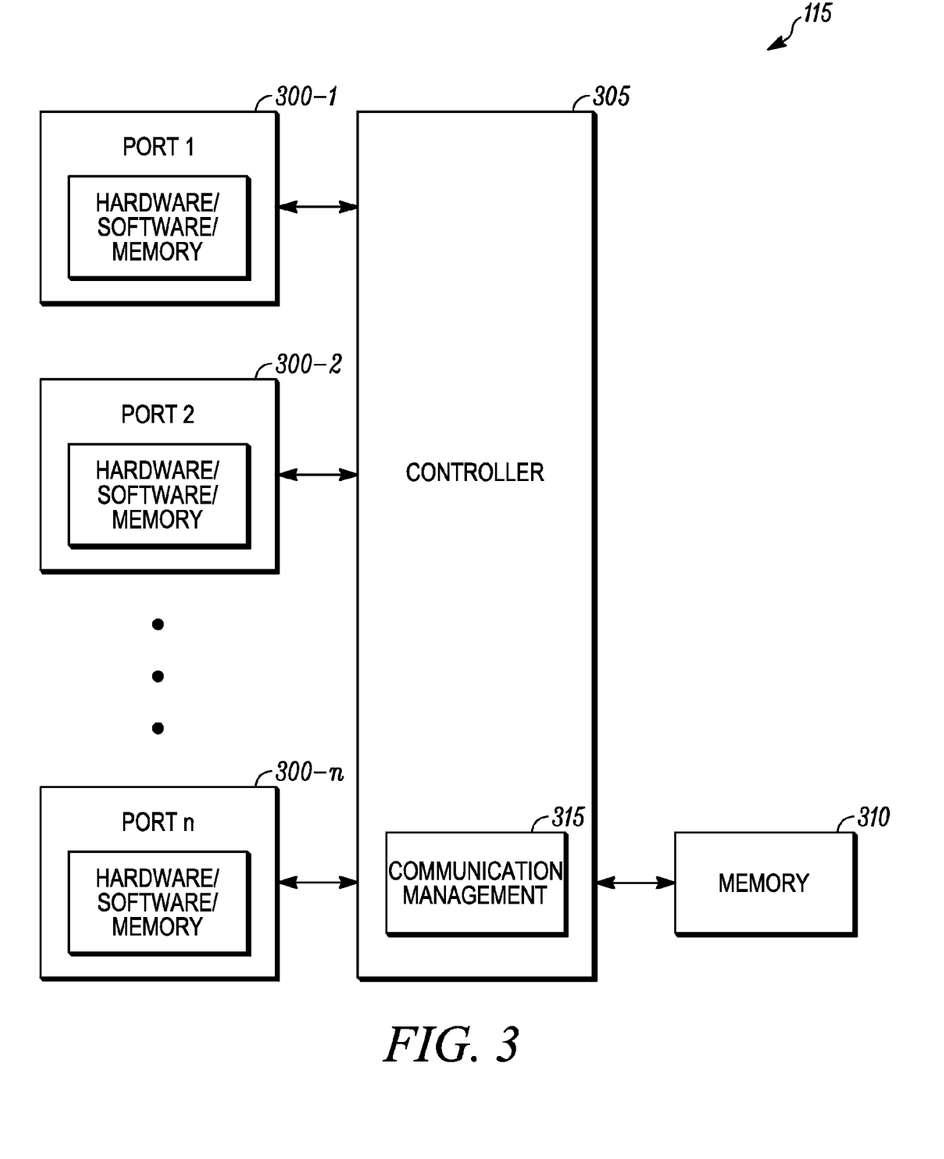
FIG. 3 illustrates an example relay station for use in the wireless communication network of FIG. 1 in accordance with some embodiments of the present invention.

FIG. 3 illustrates a relay station 115 in accordance with at least some embodiments of the present invention. As illustrated, the relay station 115 comprises a plurality of ports 300-$n$. Each port 300-$n$ may be designated for use as, for example, an IEEE 802.16 port or a backhaul port. For example, the plurality of ports 300-$n$ can include an IEEE 802.16 port, which is used to communicate with one or more base stations, one or more relay stations and/or one or more subscriber stations. The relay station 115 further comprises a controller 305 and a memory 310.

An IEEE 802.16 port, for example, provides an endpoint or "channel" for 802.16 network communications by the relay station 115. For example, the relay station 115 can communicate with one or more base stations and/or one or more relay stations and/or one or more subscriber stations within an 802.16 network using the IEEE 802.16 port. An IEEE 802.16 port, for example, can be used to transmit and receive both data and management information.

Each of the ports 300-*n* are coupled to the controller 305 for operation of the relay station 115. Each of the ports employs conventional demodulation and modulation techniques for receiving and transmitting communication signals respectively, such as packetized signals, to and from the relay station 115 under the control of the controller 305. The packetized data signals can include, for example, voice, data or multimedia information, and packetized control signals, including node update information.

In accordance with the present invention, the controller 305 includes a communication management block 315 for managing communication links between the relay station 115 and one or more base stations such as the base station 105 and also with one or more subscriber stations 110-*n* as will be described hereinafter. It will be appreciated by those of ordinary skill in the art that the communication management block 315 can be hard coded or programmed into the relay station 115 during manufacturing, can be programmed over-the-air upon customer subscription, or can be a downloadable application. It will be appreciated that other programming methods can be utilized for programming the communication management block 315 into the relay station 115. It will be further appreciated by one of ordinary skill in the art that the communication management block 315 can be hardware circuitry within the relay station 115. In accordance with the present invention, the communication management block 315 can be contained within the controller 305 as illustrated, or alternatively can be an individual block operatively coupled to the controller 305 (not shown).

To perform the necessary functions of the relay station 115, the controller 305, and/or the communication management block 315 are each coupled to the memory 310, which preferably includes a random access memory (RAM), a read-only memory (ROM), an electrically erasable programmable read-only memory (EEPROM), and flash memory. It will be appreciated by those of ordinary skill in the art that the memory 310 can be integrated within the relay station 115, or alternatively, can be at least partially contained within an external memory such as a memory storage device. The memory storage device, for example, can be a subscriber identification module (SIM) card.

In typical systems such as the network 100, IEEE 802.16 base stations (BSs) do not forward traffic to other base stations on the IEEE 802.16 air interface. Further, IEEE 802.16 Relays (RSs) can forward traffic to base stations, relay stations, or subscriber stations (SSs). As previously mentioned, the relay stations are themselves managed/controlled by at least one of the base stations. Further relay stations can be fixed, nomadic or mobile.

Figure 4:
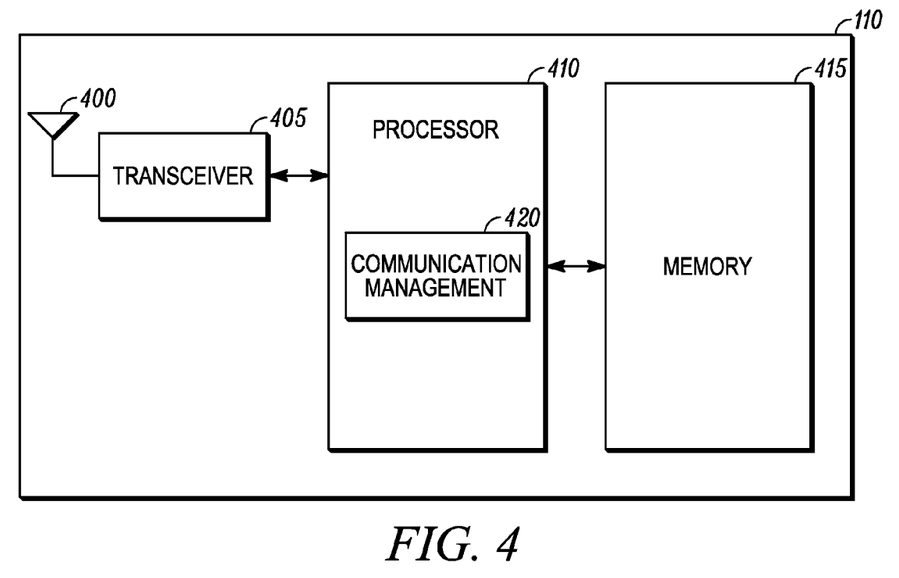
FIG. 4 illustrates an example subscriber station for use in the wireless communication network of FIG. 1 in accordance with at least some embodiments of the present invention.

FIG. 4 is an electronic block diagram of one embodiment of a subscriber station 110 in accordance with at least some embodiments of the present invention. The terminology "subscriber station" and "mobile station" are used interchangeably herein to refer to subscribers who may be fixed, nomadic or mobile. As illustrated, the subscriber station 110 includes an antenna 400, a transceiver (or modem) 405, a processor 410, and a memory 415.

The antenna 400 intercepts transmitted signals from one or more base stations 105, one or more relay stations 115, and/or one or more subscriber stations 110 within the network 100 and transmits signals to the one or more base stations 105, one or more relay stations 115, and/or one or more subscriber stations 110 within the network 100. The antenna 400 is coupled to the transceiver 405, which employs conventional demodulation techniques for receiving and transmitting communication signals, such as packetized signals, to and from the subscriber station 110 under the control of the processor 410. The packetized data signals can include, for example, voice, data or multimedia information, and packetized control signals, including node update information. When the transceiver 405 receives a command from the processor 410, the transceiver 405 sends a signal via the antenna 400 to one or more devices within the network 100. For example, the subscriber station 110 can communicate with one or more base stations and/or one or more relay stations and/or one or more subscriber stations within an 802.16 network by the antenna 400 and the transceiver 405 using IEEE 802.16, for example, to transmit and receive both data and management information.

In an alternative embodiment (not shown), the subscriber station 110 includes a receive antenna and a receiver for receiving signals from the network 100 and a transmit antenna and a transmitter for transmitting signals to the network 100. It will be appreciated by one of ordinary skill in the art that other similar electronic block diagrams of the same or alternate type can be utilized for the subscriber station 110.

Coupled to the transceiver 405, is the processor 410 utilizing conventional signal-processing techniques for processing received messages. It will be appreciated by one of ordinary skill in the art that additional processors can be utilized as required to handle the processing requirements of the processor 410.

In accordance with the present invention, the processor 410 includes a communication management block 420 for managing communication between the subscriber station 110 and at least one base station 105, relay station 115, or subscriber station 110. It will be appreciated by those of ordinary skill in the art that the communication management block 420 can be hard coded or programmed into the subscriber station 110 during manufacturing, can be programmed over-the-air upon customer subscription, or can be a downloadable application. It will be appreciated that other programming methods can be utilized for programming the communication management block 420 into the subscriber station 110. It will be further appreciated by one of ordinary skill in the art that the communication management block 420 can be hardware circuitry within the subscriber station 110. In accordance with the present invention, the communication management block 420 can be contained within the processor 410 as illustrated, or alternatively can be an individual block operatively coupled to the processor 410 (not shown).

To perform the necessary functions of the subscriber station 110, the processor 410 is coupled to the memory 415, which preferably includes a random access memory (RAM), a read-only memory (ROM), an electrically erasable programmable read-only memory (EEPROM), and flash memory. It will be appreciated by those of ordinary skill in the art that the memory 415 can be integrated within the subscriber station 110, or alternatively, can be at least partially contained within an external memory such as a memory storage device. The memory storage device, for example, can be a subscriber identification module (SIM) card.

In an IEEE 802.16j multihop network such as the one shown in FIG. 1, data and control communications are typically managed centrally at the base station 105. Central control at the base station 105 therefore typically results in centralized scheduling schemes where each node (i.e. relay station 115-*n*, subscriber station 110-*n*, and the like) informs the base station 105 of its data transfer requirements on the uplink, and where the base station 105 estimates data transfer requirements of each node on the downlink based on the node's ingress data traffic observed at the base station. The base station 105 then considers a global network view and decides a schedule for different nodes to access the channel resources. While this demand-assigned scheduling technique is generally very efficient in terms of utilization of the channel resources, it can result in high overhead when bandwidth request and grant messages have to be relayed across multiple hops. For instance in the network shown in FIG. 1, in order to schedule a transmission on link D 120-D, RS3 115-3 would have to make requests and receive grants that travel over link A 120-A, link B 120-B, and link C 120-C. In addition, with fully centralized scheduling approach, additional bandwidth allocations need to be made to carry the requests and grants on these intermediate links. It is essential that these bandwidth requests and grants be kept to a bare minimum. Additionally, the protocol activity being carried over link D 120-D might be time-critical in nature, thereby rendering the central bandwidth request and grant mechanism quite undesirable.

An alternative scheduling approach is a distributed approach. In a distributed scheduling approach, each relay station 115-*n* "owns" all of its available airtime and schedules all of its transmissions locally. This can result in severe interference in the network, especially if the base station 105 is attempting to perform spatial reuse.

Therefore, there is a need for an alternative scheduling approach in which network efficiency, service latency and interference are optimally balanced. The present invention provides a framework in which the base station can control the extent of "distributedness" in the multihop relay cell. The base station permits relay stations to decide locally what messages are critical and permits them to use a subset of their allocation in a non-centralized manner. In addition, the base station may assign a particular connection identifier (CID) to either a centrally scheduled zone or a locally scheduled zone, depending on the quality of service (QoS) requirement and the type of traffic carried by the CID. For example, time-critical medium access control layer (MAC) Management messages carried on the Basic or Management CIDs may be assigned to the locally scheduled zone to improve the efficiency of the centralized scheduler. As another example, a voice over internet protocol (VoIP) flow may be assigned to a locally scheduled zone.

Figure 5:
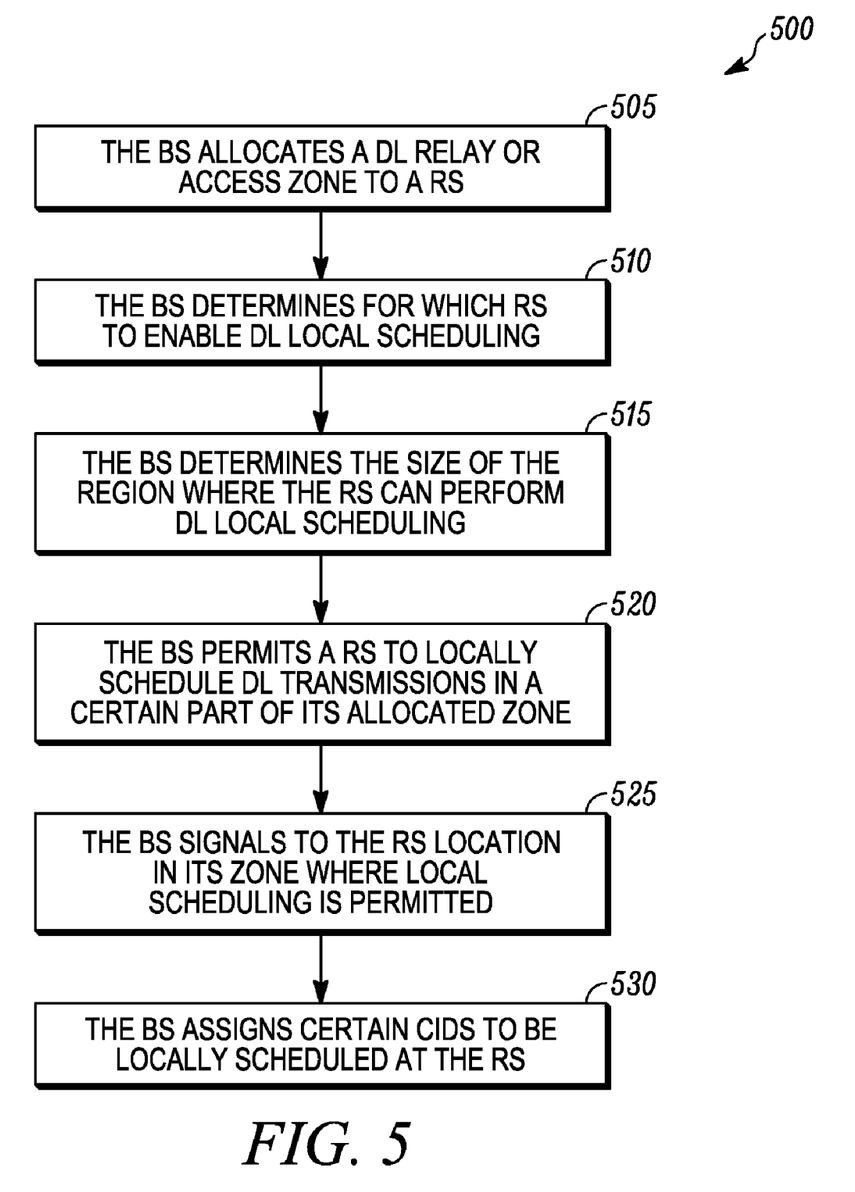
FIGS. 5 through 8 are flowcharts illustrating various operations of the wireless communication network of FIG. 1 in accordance with at least some embodiments of the present invention.

FIG. 5 is a flowchart illustrating an overall process 500 of using locally scheduled zones in a multihop network in accordance with some embodiments of the present invention. As illustrated, the operation begins with Step 505 in which the base station allocates a downlink relay or access zone to a relay station.

Next, in Step 510, the base station determines for which relay station to enable the down link local scheduling. The base station, in accordance with the various embodiments of the present invention determines which relay station to allow assignment of locally scheduled zones on the basis of the relay station's capability. For instance, only the relay stations that claim to be capable of handling time-critical services may be considered. This determination could be made as a result of the relay station's capability declaration at network entry or at any other time. Alternatively, the base station may make the determination on the basis of the QoS, requirements of the connections it handles. Alternatively, the base station may make the determination on the basis of the extent of impact it perceives doing so would have on its spatial reuse scheme.

Next, in Step 515, the base station determines the size of the region where the relay station can perform the downlink local scheduling.

Next, in Step 520, the base station permits a relay station to locally schedule downlink transmissions in a certain part of its allocated zone. In other words, the base station permits a relay station to use a certain part of its allocated zones (access zones and downlink relay zones) by locally scheduling the transmissions. The percentage of a relay station's allocation that a relay station can manage non-centrally is also decided on the basis of its capabilities, connection quality of service (QoS), and overall spatial reuse.

Next, in Step 525, the base station signals to the relay station location in its zone where local scheduling is permitted. Next, in Step 530, the base station assigns certain CIDs to be locally scheduled at the relay station; and certain CIDs to be carried in the centrally scheduled zones. For example, medium access control (MAC) management messages carrying burst allocations for the hops non-adjacent to the MR-BS could be assigned to the locally scheduled zones to decrease latency and signaling overhead of the centralized scheduler. Optionally, voice over internet protocol (VoIP) flows could also be assigned to the locally scheduled zones to also decrease latency.

Figure 6:
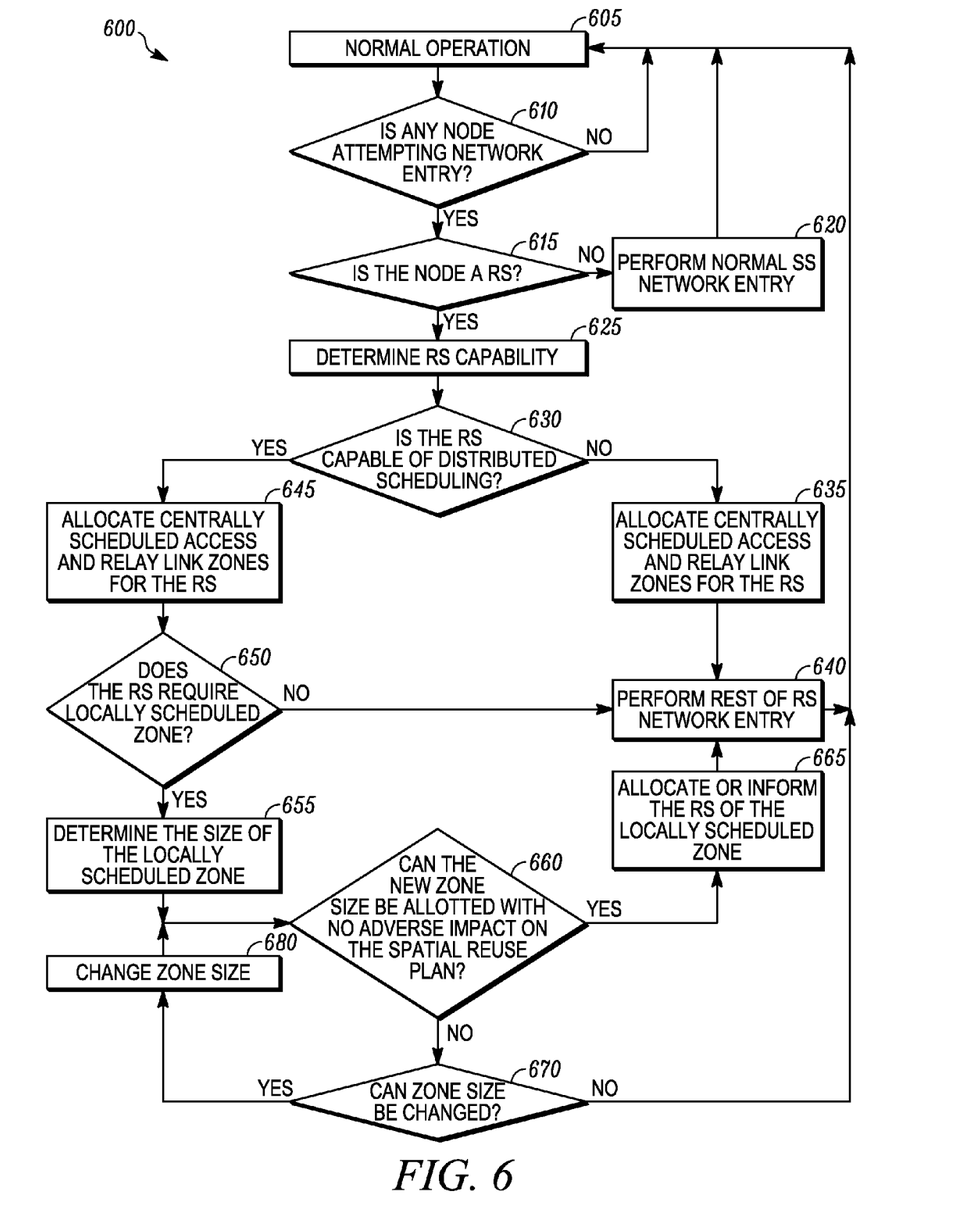

FIG. 6 is a flowchart illustrating a method 600 of assignment of locally scheduled zones to a relay station at network entry in accordance with some embodiments of the present invention. As illustrated, the operation begins with Step 605 with normal operation of the network. Next, in Step 610, it is determined whether or not a node is attempting network entry. When no node is attempting network entry, the operation cycles back to normal network operation of Step 605. When a node is attempting network entry, the operation continues to Step 615, in which it is determined whether or not the node attempting network entry is a relay station. When the node is not a relay station, the operation continues to Step 620 in which normal subscriber station network entry is performed. The operation then cycles back to normal operation of Step 605.

When the node attempting network entry in Step 615 is determined to be a relay station, the operation continues to Step 625 in which the capability of the relay station is determined. It will be appreciated by those of ordinary skill in the art that the relay station capability can be determined before or during the determination that the node attempting network entry is a relay station in accordance with the various embodiments of the present invention.

Next, in Step 630, it is determined whether the relay station is capable of distributed scheduling. When the relay station is not capable of distributed scheduling, the operation continues to Step 635 in which centrally scheduled access and relay link zones are allocated for the relay station. Next, in Step 640, the rest of the relay station network entry processes are performed. The operation then cycles back to normal operation of Step 605.

When the relay station is capable of distributed scheduling in Step 630, the operation continues to Step 645 in which centrally scheduled access and relay link zones are allocated for the relay station. Next, in Step 650, it is determined whether the relay station requires one or more locally scheduled zones. When no locally scheduled zones are required, the operation continues with Step 640 as previously described. When one or more locally scheduled zones are required, the operation continues to Step 655 in which the size of the locally scheduled zone is determined. It will be appreciated by those of ordinary skill in the art that alternatively the allocation or intimation of the locally schedule zones may occur after the network entry process is complete. Next, in Step 660, it is determined whether the new zone size can be allotted with no adverse impact on the spatial reuse plan.

When the new zone size can be allotted with no adverse impact on the spatial reuse plan, the operation continues to Step 665 with the allocation of the locally scheduled zone to the relay station and/or informing the relay station of the locally scheduled zone. The operation then continues to Step 640 as described previously herein.

When the new zone size cannot be allotted without an adverse impact on the spatial reuse plan in Step 660, the operation continues to Step 670 in which it is determined whether or not the zone size can be changed. When the zone size cannot be changed, the operation cycles back to normal operation of Step 605. When the zone size can be changed, the operation continues to Step 680 in which the zone size is changed. The operation then continues to Step 660 as described previously herein.

Figure 7:
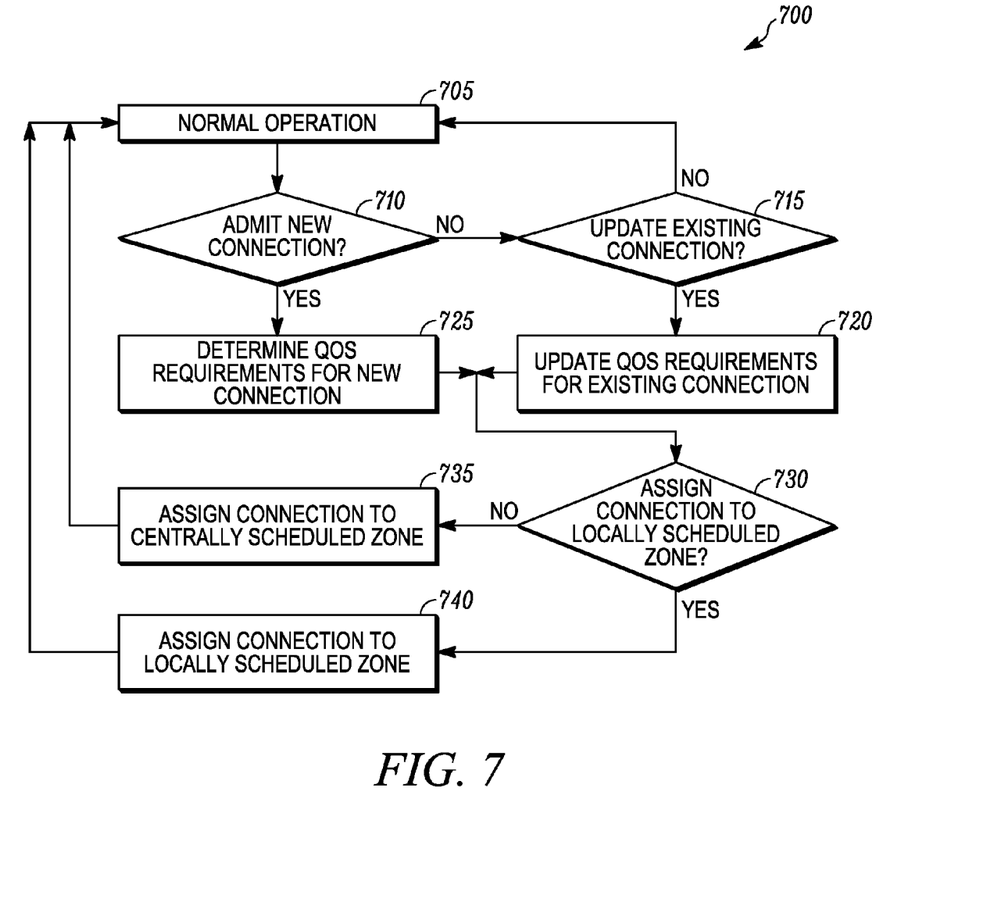

FIG. 7 is a flowchart illustrating a method 700 of assignment of CIDs to the locally scheduled zones in accordance with some embodiments of the present invention. It will be appreciated by those of ordinary skill in the art that the operation of FIG. 7 can be executed within a base station or within a relay station or within both in accordance with the various embodiments of the present invention. As illustrated, the operation begins with Step 705 in which the node (base station or relay station) operates in normal operation. Next, in Step 710, the node determines whether admission of a new connection is required/desired. When a new connection is not to be admitted, the operation continues to Step 715 in which the node determines whether or not an update to an existing connection is required/desired. When no updates to any existing connections are needed, the operation cycles back to normal operation of Step 705. When an update to an existing connection is required/desired in Step 715, the operation continues to Step 720 in which the quality of service (QoS) requirements for the existing connection are updated. Referring back to Step 710, when admission of a new connection is required/desired, the operation continues to Step 725 in which the quality of service (QoS) requirements for the new connection are determined.

After Step 720 or after Step 725, the operation continues to Step 730 in which the node determines whether the connection will be assigned to a locally scheduled zone. When the connection is not to be assigned to a locally scheduled zone, the operation continues to Step 735 in which the connection is assigned to a centrally scheduled zone. The operation then cycles back to normal operation of Step 705. When the connection, in Step 730, is determined to be assigned to a locally scheduled zone, the operation continues to Step 740 in which the connection is assigned to a locally scheduled zone. The operation then cycles back to normal operation of Step 705.

Figure 8:
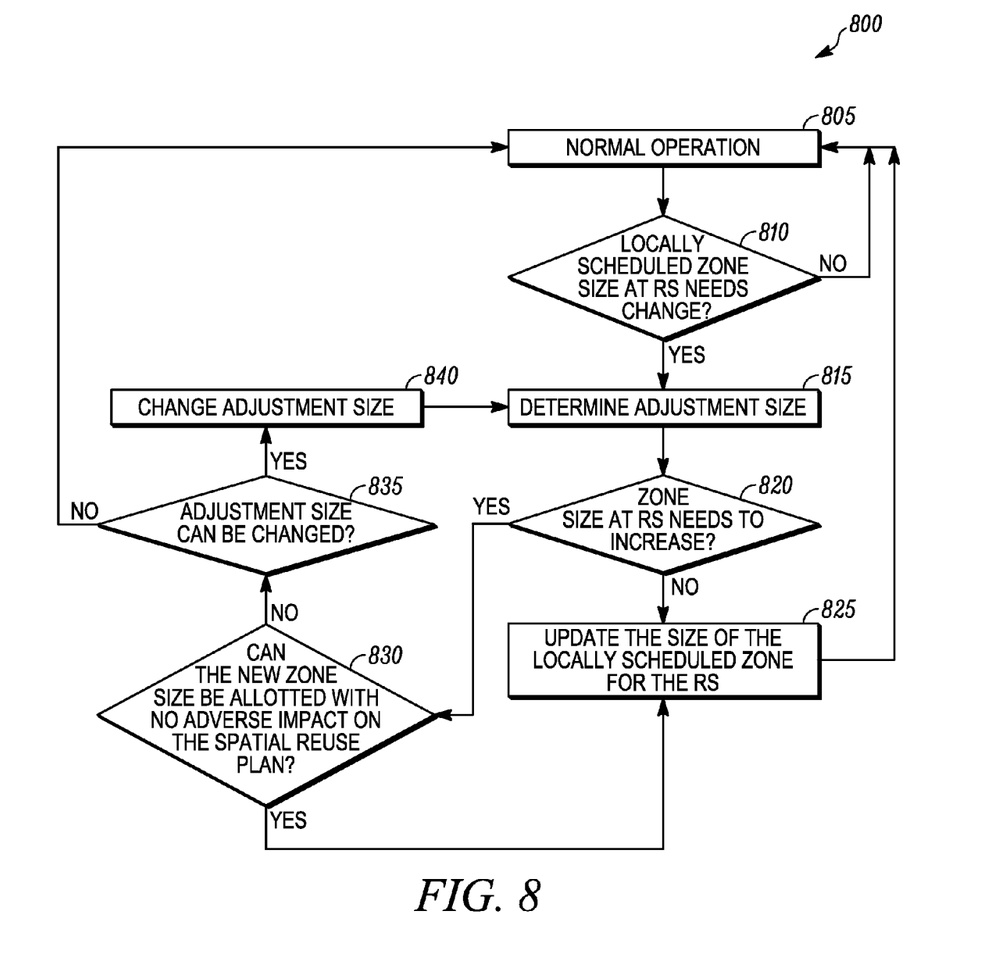

FIG. 8 illustrates a method 800 for changing the size of the locally scheduled zone at a relay station by the base station in accordance with some embodiments of the present invention. As illustrated, the operation begins with Step 805 in which the base station operates in normal operation. Next, in Step 810, the base station determines whether it is required/desired to change a locally scheduled zone size at a relay station. When it is not required/desired to change a locally scheduled zone size at a relay station within the network, the operation cycles back to normal operation of Step 805. When it is required/desired to change a locally scheduled zone size at a relay station within the network, the operation continues to Step 815 in which the base station determines the adjustment size. Next, in Step 820, the base station determines whether the zone size at the relay station needs to increase. When the zone size at the relay station does not need to increase, the operation continues to Step 825 in which the base station updates the size of the locally scheduled zone for the relay station. The operation then cycles back to normal operation of Step 805.

When the zone size at the relay station does need to increase at Step 820, the operation continues to Step 830 in which the base station determines whether the new zone size can be allotted with no adverse impact on the spatial reuse plan. If the new zone size can be allotted with no adverse impact on the spatial reuse plan, the operation continues to Step 825 as previously described herein. If the new zone size can not be allotted without an adverse impact on the spatial reuse plan, then the operation continues to Step 835 in which the base station determines whether the adjustment size can be changed. If the adjustment size cannot be changed, then the operation cycles back to normal operation of Step 805. If the adjustment size can be changed, then the operation continues to Step 840 in which the adjustment size is changed. The operation then continues to Step 815 as previously described herein.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of communication scheduling in a multihop network, wherein the multihop network comprises a base station and at least one relay station, the method comprising:
   allocating a downlink relay zone to a relay station;
   determining whether to enable downlink local scheduling at the relay station on the basis of the relay station's capability;
   when the determining step leads to a positive result:
      enabling the down link local scheduling at the relay station;
      assigning a first one or more connection identifiers to be locally scheduled at the relay station for communication on a first portion of the downlink relay zone; and
      assigning a second one or more connection identifiers to be centrally scheduled by the base station for communication on a second portion of the downlink relay zone; and
   when the determining step leads to a negative result:
      assigning one or more connection identifiers to be centrally scheduled by the base station for communication on the downlink relay zone.

2. A method of communication scheduling as claimed in claim 1, wherein the determining step comprises determining whether the relay station is capable of handling time-critical services.

3. A method of communication scheduling as claimed in claim 1, wherein the determining step comprises determining the quality of service requirements of the connections the relay station handles.

4. A method of communication scheduling as claimed in claim 1, wherein the determining step comprises determining an impact the local scheduling will have on a spatial reuse scheme of the base station.

5. A method of communication scheduling as claimed in claim 1, further comprising:
   setting a size of a region where the relay station can perform the downlink local scheduling.

6. A method of communication scheduling as claimed in claim 5, wherein the size of the region is determined using one or more of a group of factors selected from a one or more relay station capability, a load handled, a connection quality of service, and a spatial reuse.

7. A method of communication scheduling as claimed in claim 1, wherein each of the first one or more connection identifiers assigned to be locally scheduled identifies a connection which carries one or more critical messages identified by the base station.

8. A method of communication scheduling as claimed in claim 1, wherein each of the first one or more connection identifiers assigned to be locally scheduled identifies a connection which carries one or more medium access control layer (MAC) management messages.

9. A method of communication scheduling as claimed in claim 1, wherein each of the first one or more connection identifiers assigned to be locally scheduled identifies a connection which carries one or more voice over internet protocol (VoIP) flows.

* * * * *